United States Patent [19] [11] 4,005,399

Pazemenas [45] Jan. 25, 1977

[54] IMPEDANCE SENSITIVE POWER LINE INTRUSION ALARM SYSTEM

[75] Inventor: Vytautas V. Pazemenas, Sunnyvale, Calif.

[73] Assignee: The United States of America as represented by the Secretary of the Air Force, Washington, D.C.

[22] Filed: Feb. 14, 1975

[21] Appl. No.: 550,091

[52] U.S. Cl. .......................... 340/310 R; 340/216; 340/416

[51] Int. Cl.$^{2}$ ........................................ H04M 11/04

[58] Field of Search ........... 340/310 R, 310 A, 216, 340/416, 181, 215, 213 R, 258 B; 179/2 DP, 2.5 R, 5 R; 317/49; 235/51, 92 CA, 92 EV, 92 PE; 325/31

[56] References Cited

UNITED STATES PATENTS

| | | | |
|---|---|---|---|
| 2,206,702 | 7/1940 | La Pierre | 325/31 |
| 2,587,213 | 2/1952 | Polin | 325/31 |
| 2,630,367 | 3/1953 | Rahmel | 325/31 |
| 3,115,622 | 12/1963 | Jaffe | 340/224 |
| 3,268,867 | 8/1966 | Pickett et al. | 340/310 R |
| 3,456,192 | 7/1969 | Mixsell | 325/31 |

*Primary Examiner*—John W. Caldwell
*Assistant Examiner*—James J. Groody
*Attorney, Agent, or Firm*—Joseph E. Rusz; Julian L. Siegel

[57] ABSTRACT

An alarm intrusion system using existing power lines. A sweeping oscillator controlled by a second oscillator having a lower frequency is connected to the power line through a transient clipper and a power line isolator. Connected to the sweeping oscillator and transient clipper is a bandpass filter and automatic gain control circuit, the output of which is evelope detected and fed to a bandpass filter and then to a slope amplifier or differentiator. Positive and negative level detectors responsive to changes of envelope slope are fed to a latching flip-flop via an OR gate. Also fed to the latching flip-flop is a reset pulse derived from shaping the output of the second oscillator. This pulse is also fed to an up/down counter, the direction of the count being determined by the latching flip-flop output. The count is decoded and fed to alarm circuits. The power line is connected to an inductor-capacitor circuit having a predetermined resonant frequency that is altered upon the closing of an intrusion switch.

2 Claims, 4 Drawing Figures

IMPEDANCE SENSITIVE POWER LINE INTRUSION ALARM SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to intrusion detectors, and more particularly to an alarm transmission system using existing power lines.

This alarm transmission system offers low cost intraresidential alarm transmissions via the power lines. Using these power lines as a transmission medium eliminates the costly and often unsightly wiring when an alarm system is installed in a previously constructed residence.

Besides being low in cost, the system provides reliable alarm transmission and has an extremely low false alarm rate. It is also capable of being used in a wide variety of residential wiring systems and is not affected by power line voltage variations, noise, and impedance changes.

Since the present invention is used inside residences, safety and aesthetics also become important. The potential shock hazard which is present in all power line operated devices is eliminated, and the unit is made as small, inconspicuous and aesthetically pleasing as possible.

SUMMARY OF THE INVENTION

The subject invention presents a general purpose residential intrusion detector using the household wiring as a communications medium. The invention modulates 60 cycle house current with a swept frequency oscillator. An intrusion switch is normally open and upon closing of this intrusion switch, a series resonant circuit is connected. When the frequency being swept coincides with the resonant frequency of a filter, a dip in the output sounds an alarm.

It is therefore an object of this invention to provide a reliable intrusion alarm transmission system using existing power lines.

It is another object to provide a power line intrusion system that has an extremely low false alarm rate.

It is still another object to provide a power line intrusion system that is capable of being used in a wide variety of residential wiring systems.

It is yet another object to provide a power line intrusion system that is not affected by power line voltage variation, noise, or impedance changes.

These and other objects, features and advantages of the invention will become more apparent from the following description when taken in conjunction with the illustrative embodiment in the accompanying drawings.

DESCRIPTION OF THE DRAWINGS

FIGS. *2a* and *2b* show a block diagram of the receiver/control unit as shown in FIG. 1.

DETAILED DESCRIPTION OF THE PREFERRED EMBODIMENT

Figure 1:
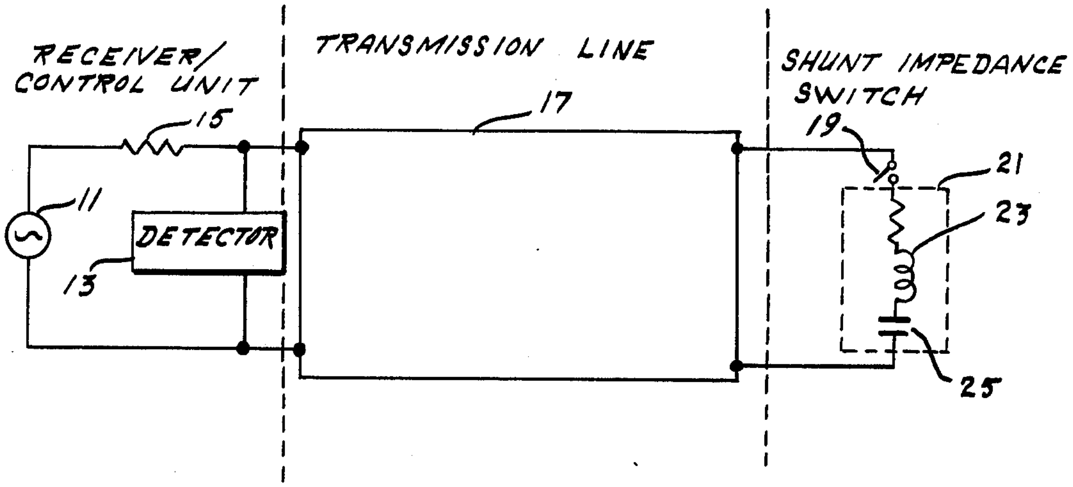
FIG. 1 shows a basic circuit diagram of the invention.

A basic simplified block diagram of this system is shown in FIG. 1 and consists of three sections: the receiver/control unit, the transmission line, and a shunt impedance switch (SIS). The receiver/control unit includes a swept frequency oscillator 11, source resistor 15 connected thereto, and detector 13 connected to oscillator 11 and source resistor 15. The signal from oscillator 11 is fed into the power line via a decoupling network to eliminate the 117 volts RMS. At the opposite terminals of the power line, the shunt impedance switch is connected. This switch is normally disconnected from the circuit by the changing of a sensing device such as a magnetic door switch, switch mat, or any other normally open switch contact. When this switch contact is closed the shunt impedance switch is placed in a circuit producing a series resonant trap at a frequency primarily determined by series inductor 23 and capacitor 25. When the signal from oscillator 11 is swept through the resonant frequency of shunt impedance switch, detector 13 notices a marked drop in the output and sounds an alarm.

The operating frequency choice is a most important consideration, and it was found that a preferred frequency range is from 104 to 116 kHz. This choice is based on numerous considerations such as the power line properties as transmission lines, the power line noise spectrum, the impedance changes due to household appliances and other types of loads, the characteristics of utility company house feeder lines, and the component characteristics of the shunt impedance switch.

A block diagram of the receiver/control unit is shown in FIGS. *2a* and *2b* and may be functionally divided into signal generator and coupling circuits, analog processing circuits, digital processing circuits, and alarm circuits.

The signal generation and coupling circuits are represented by the top row of blocks in FIG. *2a*. These are the circuits which generate the signal that samples the alarm status of the shunt impedance switch. Also included are the coupling circuits that safely couple this signal to the power line.

The preferred resonant frequency of the shunt impedance switch is 110 kHz. This frequency is above most of the low frequency noise present on the power line, and at the same time it is below the frequencies where the line impedance becomes excessively low and losses are prohibitive. A frequency of 100 kHz is avoided because it is a primary loran frequency. If a 2 percent initial tolerance is allowed on the shunt impedance switch resonant frequency, and also an additional 2 percent tolerance for resonant frequency drift with temperature (400 PPM/° C, assuming a 50° C temperature range), then a $\pm$ 5 percent sweeping range assures a worst case coverage of the shunt impedance switch resonant frequency. Sweeping oscillator 31 was therefore chosen to sweep from 104 kHz to 116 kHz.

The frequency of sweeping oscillator 31 is controlled by a 1.9 Hz triangular wave oscillator 33. The 1.9 Hz sweeping rate is a compromise choice. It is desirable to have the sweep rate as slow as possible so that 120 Hz noise components may be filtered out without affecting the desired signal, which will be periodic at the sweep rate. However, a slower sweep rate means a longer time is required for the system to process an alarm. The 1.9

Hz sweep rate allows 120 Hz noise to be filtered out, and the time required for the system to alarm is approximately one second.

The integrated circuit which can be used for sweeping oscillator 31 has both triangular and square wave outputs. The triangular wave output is preferred since the harmonic content is less, and it is therefore easier to filter the triangular wave with a low pass filter to obtain a sine wave. Before being filtered, the output of sweeping oscillator 31 is amplified in power amplifier 35 to a level such that the signal coupled to the power line is approximately 1 volt RMS. The filtering is done following the amplifier by filter 37 so that distortion introduced by the power amplifier is also removed by the filter.

Filter 37 could be a three-pole Butterworth low pass type, operating at an impedance level of 100 ohms. At 175 kHz the cutoff frequency is high enough so that the filter response is extremely flat across the 104 kHz to 116 kHz signal frequency band. Any amplitude variation introduced by the filter in the signal band is processed as signal and effectively reduces the system signal to noise ratio.

The output from low pass filter 37 is coupled to the power line through isolator circuit 39 which is connected to power supply 41. Power line isolator 39 provides low impedance coupling at frequencies near 110 kHz and high attenuation at 60 Hz and is coupled to the power line by switch 42. Transformer coupling can be used to reduce any possibility of shock hazard. Transient clipping circuit 43 is included between power line isolator 39 and low pass filter 37 to prevent any large amplitude transients which may pass through power line isolator 39 from damaging any of the electronic circuitry.

The analog processing circuits analyze the signals on the power line in the desired band and determine whether or not the shunt impedance switch unit is in the alarm state.

The signal into transient clipper 43 is effectively the same as the signal on the power line, but without the 60 Hz power frequency. This signal is used as the input to the analog processing circuits. The signal is first band pass filtered to remove extraneous signals and noise outside the desired signal frequency band. Bandpass filter 45 can be a three pole Butterworth type with a center frequency of approximately 108 kHz. The filter center frequency is the geometric means of the desired 3 db passband frequencies, which are 90 kHz and 130 kHz. This somewhat wide bandwidth is required to assure flat response over the band of 104 kHz to 116 kHz while allowing for component value tolerances. The filter output is attenuated by attenuator 47 by approximately 7 db to provide the proper signal level for automatic gain control (AGC).

AGC amplifier 49 has a gain of between 0 db and 50 db depending on the signal amplitude. The purpose of AGC amplifier 49 is to compensate for varying loads on the power line over time intervals greater than one sweep period. The power line impedance, and therefore the signal amplitude, changes every time a 60 Hz load is switched on or off. AGC amplifier 49 maintains the average signal amplitude into the detector constant. This eliminates dynamic range problems, since it is the dynamic variation in signal amplitude during each sweep which determines whether or not the shunt impedance switch is in the alarm state.

AGC threshold 51 sets the level at which the AGC action occurs and thereby the output level of AGC amplifier 49. Low pass filter 53 in the AGC control loop determines the response time of AGC amplifier 49. It is desired that AGC amplifier 49 respond as quickly as possible to a step change in signal amplitude, but not so quickly that it acts during the time required to sweep through an alarmed state of the shunt impedance switch. If the AGC response is too fast, the result will be an effective decrease in signal-to-noise ratio. The optimum filter response was determined to be approximately 0.36 Hz, and the filter can be a single pole RC type.

The AGC amplifier output is applied to envelope detector 55 which extracts the signal pulse caused by the presence of an alarmed impedance switch on the power line. If it is not in the alarm state, the output of detector 55 is a DC voltage. The output of detector 55 is post-detection filtered by bandpass filter 57 with a bandwidth of 2 Hz to 40 Hz. This bandwidth was chosen to be as narrow as possible without seriously degrading the shape or amplitude of the alarm signal pulse from detector 55.

Post-detection filter 57 is used to solve two specific problems. First, the impedance of the power line is frequency dependent and results in a small degree of variation in the signal amplitude across the 104 kHz frequency band under no-alarm conditions. This amplitude variation, or "tilt," is undesirable as it reduces the signal-to-noise ratio and increases the probability of a false alarm. The "tilt" is removed by the high pass section of post-detection filter 57.

The second reason for including post-detection filtering is that certain power line loads, notably "transformerless" radios and television sets, modulate the power line impedance at a 120 Hz rate. This is a severe problem since the power line impedance modulation is very similar to an actual alarm signal except that it occurs at a 120 Hz rate instead of at 3.8 Hz. The alarm pulses of the shunt impedance switch occur twice during each cycle of the 1.9 Hz sweep control frequency, or at a 3.8 Hz rate. Thus a post-detection low pass filter section with a corner frequency at 40 Hz removes most of the 120 Hz noise but has little effect on the signal pulses. The low pass filter section combined with the high pass section form the completed 2 Hz to 40 Hz post-detection bandpass filter.

In order for the system to have sufficient range to cover a typical residence, additional gain is required following post-detection filter 57. This gain is provided in the form of slope amplifier 59. A slope amplifier is a high-pass, or differentiating amplifier whose output is a function of the magnitude of the slope of the input signal. This type of amplifier is used because the ability of the post-detection filter to remove "tilt" is limited, and gain is not desired at very low frequencies. Furthermore, the probability of detecting a low amplitude alarm pulse is increased since the output of slope amplifier 59 has two opportunities to cross a threshold. The output of slope amplifier 59 will swing positive on the leading edge of the alarm pulse, and negative on the trailing edges thus providing two pulses to level detectors 61 and 63 for each input pulse.

To take full advantage of the slope amplifier output, two level detectors 61 and 63 are required. Slope amplifier 59 drives both positive level detector 61 and negative level detector 63. These level detectors are identical except for the reference level, and provide the thresholds which must be crossed for the receiver/control unit to determine that the shunt impedance switch is in the alarm state. The level detector outputs can be binary logic levels with zero volts indicating signal below threshold (no-alarm), and 12 volts indicating signal over threshold (alarm). The outputs of level detectors 61 and 63 are combined in OR gate 67.

Figure 2A:
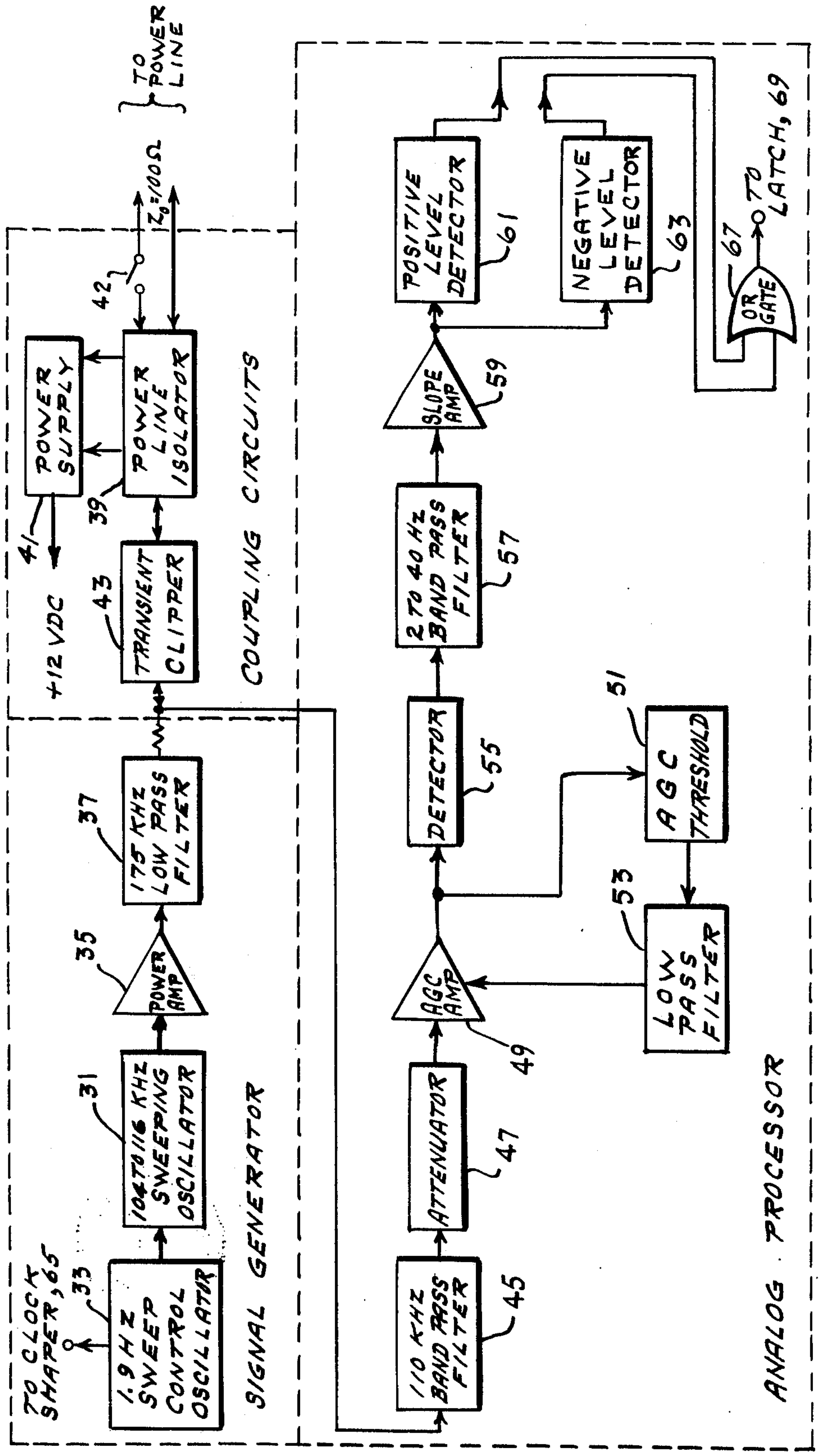
Figure 2B:
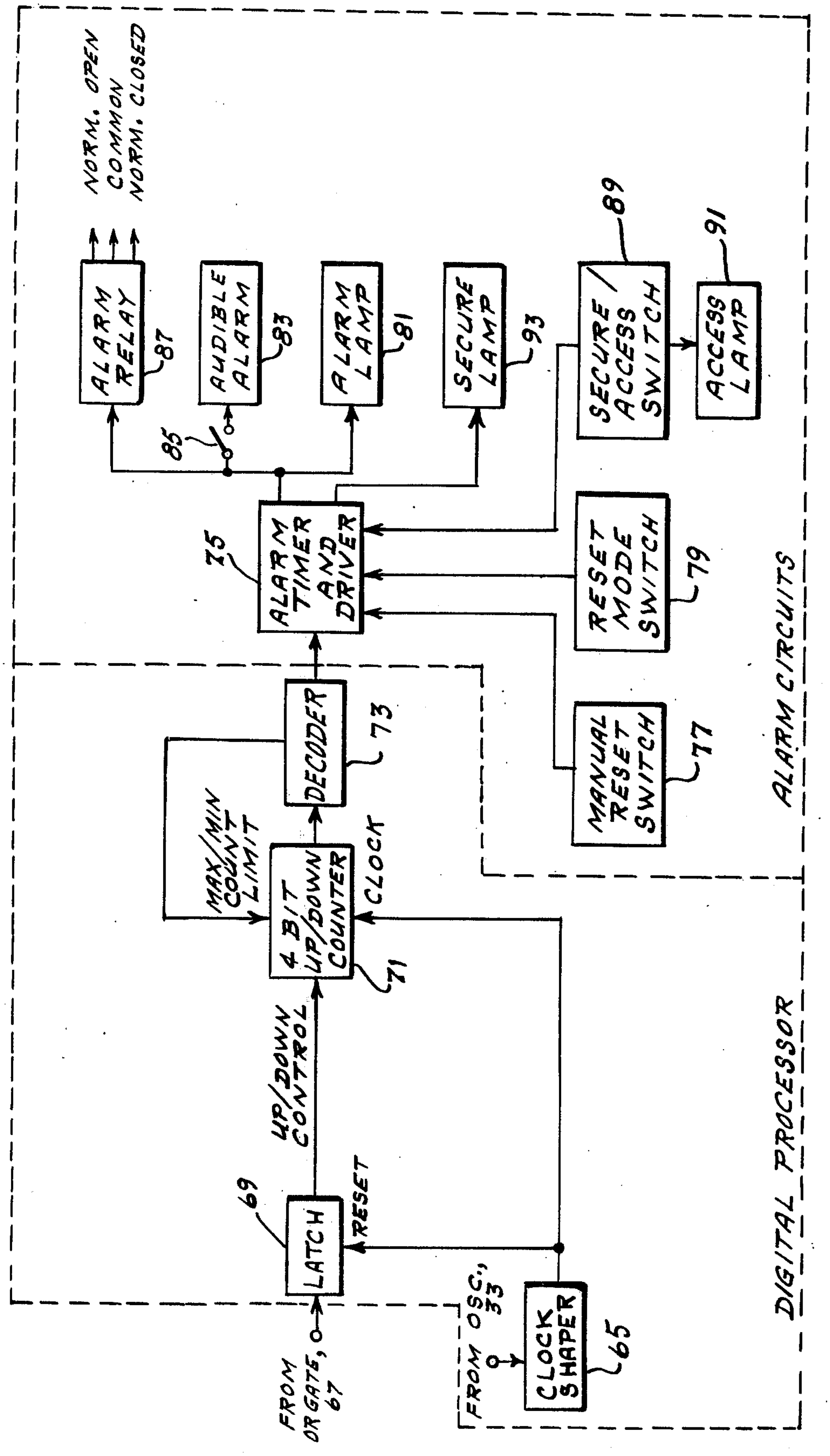

The digital processing circuits shown in FIG. 2*b* set additional requirements which must be met before the receiver/control unit will sound an alarm. This is done to reduce false alarms to a minimum while retaining full ability to respond to a legitimate alarm. The digital approach is extremely flexible and accurate and provides improved performance over analog integrators when long integration times are required.

The master clock controlling the digital circuits is derived from 1.9 Hz sweep control oscillator 33. Clock shaper circuit 65 generates a narrow clock pulse each time sweep control oscillator 33 triangular wave changes slope, or, in other words, each time sweeping oscillator 31 changes the direction of sweep. The clock pulses occur at a 3.8 Hz rate and synchronize the digital circuits with the sweep rate of sweeping oscillator 31.

The outputs of the two level detectors, combined in OR gate 67, sets latching flip-flop 69 which remembers, until it is reset by the next clock pulse, when a threshold crossing has occurred. Latching flip-flop 69 also controls the counting direction of up/down counter 71. If no threshold crossing occurs during the interval between two clock pulses, the second clock pulse causes counter 71 to count down. If a threshold crossing does occur, counter 71 then counts up. Decoding and limiting is provided so that counter 71 cannot count down past zero nor up past four. Decoder 73, connected to the output of counter 71, determines the extent of the count. Any conventional decoder can be used such as a diode matrix detector as shown on page 351 of "Pulse, Digital, and Switching Waveforms" by Millman and Taub, McGraw Hill 1965. When zero is reached in the down count direction, counter 71 stops counting and holds a count of zero until commanded to count up. When four is reached in the up count direction, counter 71 stops counting and holds a count of four until commanded to count down. Also, when the counter reaches four, decoder 73 triggers the alarm driver circuits.

The alarm circuits include an alarm timer and driver, an alarm lamp and tone generator, and all the front panel controls and indicators except the power switch. The alarm timer 75 operates as a latch when the system is in the manual reset mode will hold an alarm until manual reset button 77 is depressed. In the auto reset mode, controlled by switch 79, alarm timer 75 functions as a retriggerable one-shot with a period of approximately three seconds. In either mode, alarm timer 75 causes an alarm to sound as long as up/down counter 71 holds a count of four. If the manual reset button 77 is depressed while counter 71 maintains a count of four, the alarm is silenced only as long as the reset button is held depressed, regardless of whether the mode switch is in the auto or manual reset position. The output of alarm timer 75 can activate simultaneously alarm lamp 81, audible alarm 83 controlled by switch 85, and alarm relay 87 which has connections for other indicating devices. Secure/access switch 89 forces the logic into the no-alarm state and allows up/down counter 71 to count down to zero, regardless of the alarm status of shunt impedance switch connected to the system. The position of secure/access switch is indicated by lamps 91 and 93.

The 1.9 Hz sweep control oscillator 33 can consist of an available integrated circuit (and the associated timing components) such as the Signetics NE566V which is a function generator integrated circuit that has both triangular wave and square wave outputs. The triangular wave output is used to frequency modulate sweeping oscillator 31, and the square wave output is used to generate the clock pulses which control the digital processing circuitry. A NE566V integrated circuit also performs the sweeping oscillator function.

Power amplifier 35 can be a Motorola MC1454G integrated circuit. This device is capable of one watt output at frequencies up to 300 kHz. In this application, however, actual power output is approximately 0.2 watt, and no heat sink is required. The triangle wave output of power amplifier 35 is filtered by 175 kHz low pass filter 37 to give a sine wave output of approximately 2.3 volts rms. The filter can be a three pole Butterworth type as previously mentioned.

Transient clipping circuit 43 can consist of two 6.2 volt Zener diodes connected back-to-back in series with a current limiting resistor. The power line isolation circuit consists of a capacitor and transformer that is designed to pass frequencies around 110 kHz and block the 60 Hz power frequency. The capacitor prevents large 60 Hz currents from flowing through the secondary of the transformer.

The 110 kHz band pass filter 45 can be a three pole Butterworth type as previously mentioned. The AGC amplifier 49 can consist of Motorola MC1590G which is a wide band amplifier with differential inputs and outputs and a built-in AGC.

Detector 55 can be a transformer-coupled full-wave rectifier driven by a common emitter amplifier. Although this circuit has an additional 3 db processing gain over the simpler half wave rectifier, the main reason for using the transformer coupled full wave rectifier is that it provides nearly equal charging and discharging time constants to post-detector filter 57. That is, the loaded output impedance of the detector circuit is the same when one of the rectifying diodes is in conduction as it is when both diodes are reverse biased. This characteristic aids postdetection filtering of unwanted noise.

The 2 to 40 Hz band pass filter 57 can be a 2 Hz high pass filter followed by a 40 Hz low pass filter. The 2 Hz high pass filter can be a two-stage RC filter. The two poles of this filter are far enough apart that interaction is negligible. The 40 Hz low pass filter can be an active filter using one half of a readily available dual operational amplifier integrated circuit. The filter could be a two-pole type, and the element values chosen to give a Butterworth response.

Slope amplifier 59 uses the second half of a dual operational amplifier integrated circuit in a conventional differentiating amplifier circuit. The output voltage of this circuit is equal to the input current multiplied by the feedback impedance.

The two level detectors 61 and 63 are identical except for the reference voltage. A transistor array consisting of five transistors on the same chip can be used to make two simple differential amplifier circuits. This insures that the four transistors will have similar characteristics, and further circuit sophistication is not required. The two reference voltages as well as a "virtual ground" reference voltage for the two operational amplifiers are obtained from a single voltage divider chain. If all of the resistors in the divider have the same temperature coefficient, resistance changes with temperature will cancel and will have no net result in the circuit.

Digital clock 65 can be derived from the square wave output of 1.9 Hz sweep control oscillator 33. The positive-going edge of the square wave is differentiated, then inverted twice by transistor switches. The negative-going edge is likewise differentiated but is only inverted once.

The OR function of gate 67 combining the outputs of the two level detectors is performed by connecting the two output collectors of the two differential amplifiers to a common load resistor and using a transistor switch which turns on whenever either threshold is crossed.

COS/MOS integrated circuits are used in the logic circuits because their supply voltage requirements are compatible with the 12 volts DC used by the analog circuits. Thus only one inexpensive power supply is required.

Most of the alarm circuit functions can be performed by integrated circuits such as a Signetics NE555V timer integrated circuit. When the auto reset position is activated, the NE555V functions as a one shot multivibrator; when the manual reset position is in effect the NE555B acts as a latch.

Manual resetting is accomplished by shorting out a large part of the timing resistance, thereby exceeding the threshold internal to the NE555V, and allowing it to reset. However, if the trigger input to the timer is still "low", a new cycle will begin immediately when the manual reset button is released.

Transistor saturating switches provide the necessary drive to light the alarm lamp 81 or secure lamp 83. These are complementary transistors driven from the same source so that alarm lamp 81 and secure lamp 83 can never be lighted at the same time.

Figure 3:
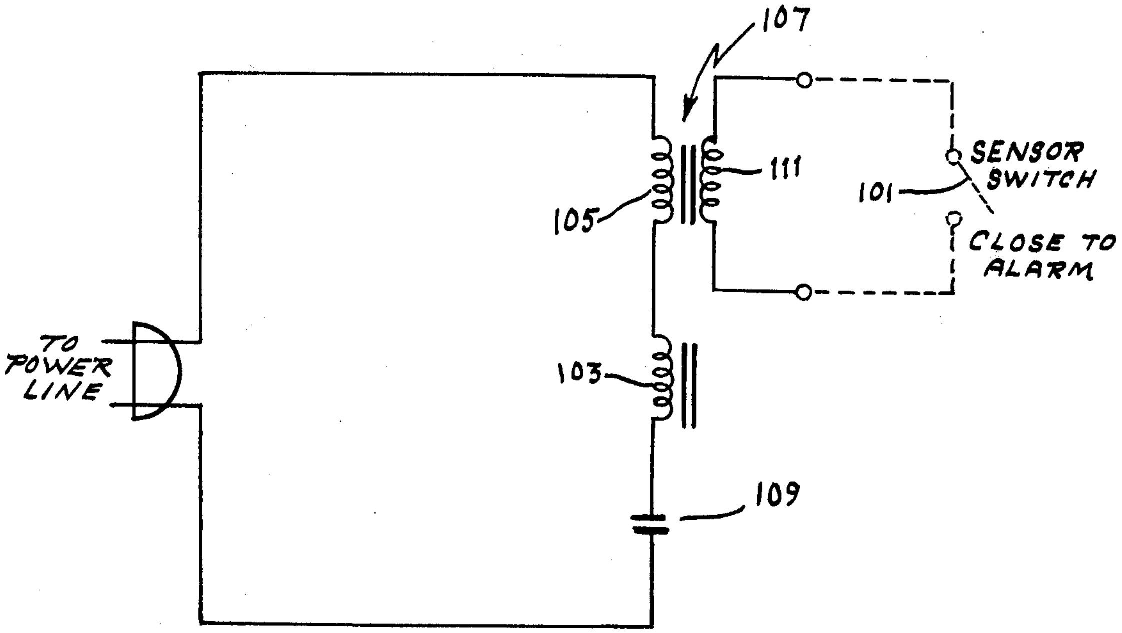
FIG. 3 shows the circuit diagram of the shunt impedance switch of that shown in FIG. 1.

A schematic diagram of the shunt impedance switch is shown in FIG. 3. This switch is a series tuned circuit having a resonant frequency which is switchable between two values by means of an external sensor switch 101. In this invention external switch 101 is provided by the intrusion sensor. When the external effective inductance of the tuned circuit is equal to the value of inductance 103 in series with the inductance of the primary winding 105 of transformer 107, and capacitor 109, the resulting resonant frequency is below 90 kHz, and the circuit impedance between 104 kHz and 116 kHz is much higher than the normal power line impedance. When the intrusion sensor switch closes, secondary winding 111 of transformer 107 is short circuited. Transformer 107 is a very tightly coupled transformer with a 1:1 turns ratio, and the short circuit is effectively reflected across the primary winding 105. The resulting tuned circuit is then merely inductor 103 in series with capacitor 109, and the resonant frequency changes to 110 kHz, where it is detected by the receiver/control unit.

Capacitor 109, in addition to being a component in the tuned circuit, blocks 60 Hz power currents from flowing through primary winding 105. Transformer 107 is designed to have poor coupling at 60 Hz, so that the small 60 Hz current which does pass through capacitor 109 (approximately 90 microamperes) induces a minimum of voltage across secondary winding 111. Thus external sensor switch 101 input terminals are isolated from the power line.

What is claimed is:

1. A system for transmitting an alarm through a power line upon detection of an alteration of impedance thereon, comprising:

a. a time control means;

b. a sweeping oscillator fed by the output of the time control means;

c. a power line;

d. means for altering the impedance on the power line upon an intrusion, the impedance altering means being connected to the power line;

e. means for coupling the sweeping oscillator to the power line, including 2. a transient clipper connected to the output of the sweeping oscillator for protecting same, and 2. a power line isolator fed by the output of the transient clipper, the isolator being connected to the power line;

f. an automatic gain control circuit connected to the transient clipper;

g. an envelope detector fed by the output of the automatic gain control circuit for extracting an intrusion signal;

h. a slope amplifier whose output is a function of the slope of the intrusion signal fed by the output of the envelope detector;

i. a positive detector for detecting positive slopes of the signal pulses and fed by the output of the slope amplifier;

j. a negative detector for detecting negative slopes of the signal pulses and fed by the output of the slope amplifier;

k. an OR gate fed by the output of the positive detector and the negative detector;

l. a latching flip-flop fed by the output of the OR gate and reset by the time control means;

m. an up/down counter fed by the output of the time control means for counting pulses therefrom, the direction of the up/down counter being controlled by the latching flip-flop;

n. a decoder circuit fed by the output of the up/down counter for recognizing a predetermined count in the up/down counter; and o. an alarm system fed by the output of the decoder upon reaching the predetermined count in the up/-down counter.

2. A system for transmitting an alarm through a power line according to claim 1 wherein the impedance altering means comprises:

a. a capacitor having one terminal connected to one terminal of the power line;

b. an inductor in series connection with the capacitor;

c. a transformer having a primary winding and a secondary winding with the primary winding being connected to the other terminal of the power line and in series connection with the inductor and the capacitor, and d. a sensor switch across the terminals of the secondary winding.

* * * * *